United States Patent Office 3,404,014
Patented Oct. 1, 1968

3,404,014
DUPLICATING INK
Walter G. Drautz, Delmar, N.Y., assignor to GAF
Corporation, a corporation of Delaware
No Drawing. Filed Oct. 18, 1963, Ser. No. 317,152
13 Claims. (Cl. 106—22)

The present invention relates, in general, to duplicating ink formulations and, in particular, to duplicating ink formulations containing metalliferous monoazo dyes.

Duplicating inks, of the type employed with stencils, ball point pens and the like must possess a variety of desirable characteristics in order to be considered commercially acceptable. In addition to being free flowing and sufficiently viscous to prevent running, duplicating inks should be non-smearing and free of oil migration. Many commercially available duplicating inks, however, smear and are subject to oil migration and "Halo" effects. In addition, many of the inks cause stains to the skin of the user which are difficult to remove.

Another problem inherent in the use of many inks now available on the market, and perhaps their most serious draw-back is that they are prepared with a high solvent content thus creating a hazard in the storage and use thereof. Other serious objections which have been raised with respect to many duplicating inks are that prints prepared therefrom do not dry quickly and ink pads impregnated with these inks dry out rapidly when exposed to air.

Accordingly, it is an object of this invention to produce a homogenous, free-flowing duplicating ink of medium high viscosity.

Another object of this invention is to produce duplicating ink formulations which are non-smearing and are free of oil migration and "Halo" effects.

A further object of this invention resides in the provision of duplicating ink formulations which do not contain flammable solvents.

Yet another object of this invention resides in the provision of ink formulations which when used in duplicating devices produce prints which dry fairly rapidly.

Other objects and advantages will become further apparent from the following detailed description of the invention.

It has now been discovered that the aforesaid objects can be readily achieved and that a homogenous, free flowing ink of medium high viscosity is produced by formulations comprising a neutral dyeing dye, water, a sulfonated castor oil, rosin size and a non-ionic surfactant.

The neutral dyeing dyes employed in the ink formulations of this invention are characterized as metalliferous azo dyes which contain one atom of metal bound in complex union to two molecules of different monoazo dyes wherein the dyes are free from carboxylic acid groups in a position other than the ortho-position relative to the azo linkage and which together contain not more than one sulfonic acid group.

Metalliferous dyestuffs which can be employed with advantage in preparing the ink formulations of this invention include: (a) metal compounds which contain one atom of metal bound in complex union to two molecules of different monoazo-dyestuffs, of which one is free from carboxylic acid groups present in a position other than an ortho-position relatively to the azo linkage and contains a single free, that is to say, not functionally converted, sulfonic acid group and the other is free from sulfonic acid and carboxylic acid groups, and at least one of which dyestuffs, advantageously that which is free from sulfonic acid groups, contains a sulfonic acid aryl ester group or more especially a sulfonic amide group or a sulfone group. (b) Metal compounds which contain one atom of metal bound in complex union to two molecules of different monoazo-dyestuffs, both of which are free from carboxylic acid groups in a position other than an ortho-position relatively to the azo-linkage, and free from functionally converted sulfonic acid groups and sulfone groups, and of which one contains a single free sulfonic acid group and the other is free from sulfonic acid groups.

In general it is of advantage to use in the present process metalliferous dyestuffs of the aforesaid kinds which are free from substantial quantities of metal compounds which contain one atom of metal bound in complex union per molecule of dyestuff. In the case of dyestuffs which contain no functionally converted sulfonic acid groups or sulfone groups, it is of advantage to use products which are free from substantial quantities of metal compounds which contain one atom of metal bound in complex union to two molecules of the same dyestuff.

The monoazo-dyestuffs necessary for making the metal compounds to be used in the present process can be obtained, for example, from the following diazo-components and coupling components, subject to the choice of these components being made with due regard to the requirements specified above:

Diazo-components: 4- or 5-chloro 2-amino-1-hydroxybenzene, 4- or 5- or 6-nitro-2 amino-1-hydroxybenzene, 4:6-dichloro-2-amino-1-hydroxybenzene, 3:4:6-trichloro-2-amino-1-hydroxybenzene, 4-chloro-5- or 6-nitro-2 amino-1-hydroxybenzene, 4-nitro-6-chloro-2-amino-1-hydroxybenzene, 6-nitro-4-methyl-2-amino-1-hydroxybenzene, 4-nitro-6-acetylamino-2-amino-1-hydroxybenzene, 6-nitro-4-acetylamino-2-amino-1-hydroxybenzene, 4:6-dinitro-2-amino-1-hydroxybenzene, 1-amino-2-hydroxynaphthalene, 2-aminobenzoic acid, 2-aminobenzene-1-carboxylic acid-4- or 5-sulfonic acid, 2-amino-1-hydroxybenzene-4- or 5-sulfonic acid, 4-chloro- or 4-methyl-2-amino-1-hydroxybenzene-5- or 6-sulfonic acid, 4-nitro-2-amino-1-hydroxybenzene-6-sulfonic acid, 6-nitro-2-amino-1-hydroxybenzene-4-sulfonic acid, and above all naphthalene compounds such as: 2-amino-1-hydroxynaphthalene-4- or 8-sulfonic acid, 6-bromo- or 6-methyl-1 amino-2-hydroxynaphthalene-4-sulfonic acid and especially 1-amino-2-hydroxynaphthalene-4-sulfonic acid or 6-nitro-1-amino-2-hydroxynaphthalene-4-sulfonic acid, 4-chloro- or 4-nitro-2-amino-1-hydroxybenzene-6-sulfonic acid amide, 6-nitro-2-amino-1-hydroxybenzene-4-sulfonic acid amide, 2-amino-1-hydroxybenzene-4- or -5-sulfonic acid amide, 2-amino-1-hydroxybenzene-4- or -5-sulfonic acid phenylamide, 2-amino-1-hydroxybenzene-4- or -5-sulfonic acid mono- or dimethylamide, 4-chloro-2-amino-1-hydroxybenzene-5-sulfonic acid methylamide, ethylamide, isopropylamide or phenylamide, 4-chloro-2-amino-1-hydroxybenzene-5-sulfonic acid dimethylamide, diethylamide, N-β-hydroxyethyl-N-phenylamide, N-methyl-N-β-hydroxyethylamide, N-methyl-N-phenyl- or N-ethyl-N-phenylamide, and the corresponding compounds, which contain instead of a sulfonic acid amide group, a methyl-sulfone group, an ethyl-sulfone group and especially a phenyl-sulfone group, a para-methyl-phenyl- or para-chlorophenyl-sulfone group.

Coupling components: hydroxybenzenes such as para-cresol or paratertiary amyl-phenol, 4-methyl-2-acetylamino-1-hydroxybenzene, 4-acetylamino-1-hydroxybenzene, β-ketocarboxylic acid esters or amides such as acetoacetic acid anilide and 1-acetoacetylamino-2-, -3- or -4-chlorobenzene, pyrazolones such as: 1-phenyl-2-methyl-5-pyrazolones, 1:3 diphenyl-5-pyrazolone, 1-(2'-, 3'- or 4' chlorophenyl)-3-methyl-5-pyrazolone, 1-(2'-, 3'- or 4'-methyl-phenyl)-3-methyl-5-pyrazolone, 1-(2':5'-dichlorophenyl)-3-methyl-5-pyrazolone, 1-(naphthyl-(1')- or -(2')-3-methyl)-5-pyrazolone, 1-(2'-ethyl- or 4'-ethylphenyl)-3-methyl-5-pyrazolone, 1- phenyl-5-pyrazolone-3-carboxylic acid phenylamide, 1-n-octyl-3-methyl-5-pyrazolone, hydroxyquinolines, barbituric acids and naphthylamines such as 6-bromo-, 6-methoxy- or 6-methyl-2-aminonaphthalene, 2-aminonaphthalene itself and 2-aminonaphthalene-1-sulfonic acid which is known to couple to form the same dyestuffs as 2-aminonaphthalene with the splitting off of the —$SO_3H$ group in the 1-position, and also naphthols such as 6-bromo- or 6-methoxy-2-hydroxynaphthalene and especially 1-acetylamino-7-hydroxynaphthalene, 1-n-butyryl-amino-7-hydroxynaphthalene, 1-benzoylamino-7-hydroxynaphthalene, 1-carbethoxyamino-7-hydroxynaphthalene, 8-chloro-1-hydroxynaphthalene, 5-chloro-1-hydroxynaphthalene, 5:8-dichloro-1-hydroxynaphthalene, 4:8- or 5:8-dichloro-2-hydroxynaphthalene, 2-hydroxynaphthalene and, if desired, 1-hydroxynaphthalene, 1-phenyl-3-methyl-5-pyrazolone-2'-, 3'- or 4'-sulfonic acid, 2'-chloro-1-phenyl-3-methyl-5-pyrazolone-4'- or -5'-sulfonic acid, 2':5'-dichloro-1-phenyl-3-methyl-5-pyrazolone-4'-sulfonic acid, 1-(naphthyl-(1'))-3-methyl-5-pyrazolone-4'-, -5'-, -6'-, -7'-, or -8'-sulfonic acid, 1-(naphthyl-(2'))-3-methyl-5-pyrazolone-6' or -8'-sulfonic acid, 1-acetoacetylamino-benzene-4-sulfonic acid, and above all 2-amino- or 2-hydroxy-naphthalene-4-, -5- or -6- or -7-sulfonic acid, 1-hydroxynaphthalene-4-, -5- or -8- sulfonic acid, 1-phenyl-3-methyl-5-pyrazolone-3'-sulfonic acid amide or -3'-sulfonic acid methylamide, amides of 2-aminonaphthalene-4-, -5- or -6-sulfonic acid, of 1-hydroxynaphthalene-4-, -5- or -8-sulfonic acid or of 2-hydroxynaphthalene-4-, -5-, -6- or -7-sulfonic acid.

The dyestuffs used in the present process can be made by treating a mixture of two different metallizable monoazo-dyestuffs, obtainable for example, from the components mentioned above, one of which dyestuffs is free from carboxylic acid groups in a position other than an ortho-position relatively to the azo linkage and from sulfonic acid groups and the other is also free from carboxylic acid groups in a position other than an ortho-position relatively to the azo linkage and contains a single sulfonic acid group, with an agent yielding metal in such manner that the resulting metalliferous dyestuff contains one atom of metal bound in complex union with two molecules of different monoazo-dyestuffs (1:2-complex).

Another method of making the dyestuffs to be used in the present process consists in reacting in a molecular ratio of about 1:1 a metallizable metal-free monoazodyestuff and a complex metal compound of a monoazodyestuff, which contains one atom of metal in complex union per molecule of dyestuff (1:1-complex), and so choosing the starting materials that they are both free from carboxylic acid groups in a position other than an ortho-position relatively to the azo linkage and one of them, advantageously the complex metal compound, contains a single free sulfonic acid group and the other is free from sulfonic acid groups.

The method first mentioned above is generally very well suited for making the dyestuffs of the type (a) mentioned above, while the second of the methods described above is especially suitable for making the dyestuffs of the type (b) mentioned above.

In carrying out the method first mentioned above it is generally of advantage to treat a mixture of one molecular proportion of each of two different dyestuffs with a quantity of an agent yielding metal corresponding to about one atomic proportion of metal and/or to carry out the metallization in a weakly acid to alkaline medium. Accordingly, there are especially suitable for carrying out the process those agents yielding metal which are stable in alkaline media, for example, cobalt compounds and especially chromium compounds of aliphatic hydroxycarboxylic acids or dicarboxylic acids or aromatic orthohydroxy-carboxylic acids, which contains the metal in complex union. As examples of aliphatic hydroxycarboxylic acids there may be mentioned, inter alia, lactic acid, citric acid and especially tartaric acid, and as a dicarboxylic acid there may be mentioned oxalic acid and among the aromatic hydroxy-carboxylic acids there may be mentioned those of the benzene series such as, 4-, 5- or 6-methyl-1-hydroxybenzene-2-carboxylic acid and above all 1-hydroxybenezene-2-carboxylic acid itself. As agents yielding cobalt, however, there are advantageously used simple cobalt salts, such as cobalt sulfate, cobalt acetate or, if desired, freshly precipitated cobalt hydroxide.

The conversion of the dyestuffs into the complex metal compounds is advantageously carried out at a raised temperature, under atmospheric or superatmospheric pressure, for example, at the boiling temperature of the reaction mixture, if desired in the presence of suitable additions, for example in the presence of salts of organic acids, bases, organic solvents or other agents assisting the formation of complexes.

The 1:1-complexes used as starting materials in the method second mentioned above can be obtained by methods in themselves known, for example, by reacting the monoazo-dyestufls free from complex-forming metal, advantageously the dyestuff which contains the sulfonic acid group, in an acid medium with an excess of a salt of the appropriate metal, for example a cobalt salt or advantageously a salt of trivalent chromium, such as chromium formate, chromium sulfate or chromium fluoride, at the boiling temperature, or, if desired, at a temperature above 100° C. For converting the metal-free dyestuffs free from sulfonic acid groups into the 1:1-complexes it is generally of advantage to carry out the metallization in known manner, for example, in the presence of an organic solvent such as alcohol or formamide.

In general it is of advantage, after preparing and separating the starting materials necessary for making the 1:2-complexes, not to dry them but to use them in the form of moist pastes.

The reaction of the 1:1-metal complexes with the metal-free dyestuffs is advantageously carried out in an aqueous neutral to weakly alkaline medium, in an open vessel or a closed vessel, at the ordinary or a raised temperature, for example at a temperature within the range of 50–120° C. It is generally desirable to react together substantially equivalent quantities of the metalliferous 1:1-complex and metal-free dyestuff, the molecular ratio of the metal-free dyestuff and the 1:1-complex advantageously being at least 0.85:1 and at most 1:0.85. An excess of the metalliferous dyestuff usually has a less disadvantageous effect than an excess of the metal-free dyestuff. Generally speaking, the closer the ratio is to 1:1 the more advantageous is the result.

When the products so obtained still contain a detectable quantity of the 1:1-complex used as starting material, for example, about 0.1 mol of the 1:1-complex per mol of the 1:2-complex obtained as final product, it is generally desirable subsequently to convert this excess into a 1:2-complex.

There may be after-treated in an analogous manner products which contain an excess of the metal-free dyestuff, by adding after the reaction a metallizable monoazodyestuff in a quantity which is at least equimolecular with respect to the excess of the metal-free dyestuff, and treating the whole with an agent mentioned above as being suitable for the production of 1:2-complexes. Other metalliferous monazo dyes which can be employed are those described in and claimed in U.S. Patent 2,906,746.

The metalliferous monoazo dye is usually present in the ink formulations in an amount which will provide a full shade. Recommended amounts to be employed to provide a full shade range from about 3 to about 10 parts of dye per 100 parts of ink formulation.

Another essential ingredient in the ink formulations of this invention is the non-ionic surface active agent.

The non-ionic surface active agents employed are well known in the art and are disclosed along with suitable methods for their preparation in numerous patents and other publications. In general, they may be obtained by condensing a polyglycol ether containing the required number of alkenoxy groups or an alkylene oxide such as propylene oxide, butylene oxide, or preferably ethylene oxide, with an organic compound containing a reactive hydrogen atom. As such compounds containing a reactive hydrogen atom, there may be mentioned alcohols, phenols, thiols, primary and secondary amines, and carboxylic and sulfonic acids and their amides. The amount of alkylene oxide or equivalent condensed with the reactive hydrogen-containing compound, i.e., the length of the polyoxyalkylene chain, will depend primarily upon the particular compound with which it is condensed. As a convenient rule of thumb, an amount of alkylene oxide or equivalent should be employed which will result in a condensation product containing about 20 to 85% by weight combined alkylene oxide. However, the optimum amount of alkylene oxide for attainment of the desired hydrophobic-hydrophilic balance may be readily determined in any particular case by preliminary test and routine experimentation.

A preferred group of non-ionic surface active agents are those derived from alkyl phenolic compounds. Numerous compounds of this type, i.e. polyalkylene oxide derivatives of phenolic compounds containing one or more alkyl substituents are described in U.S. Patents 2,213,477 and 2,593,112. Those preferred are the polyalkylene oxide derivatives of alkyl compounds in which the total number of alkyl carbon atoms is between 4 and 20. As examples of such phenolic compounds may be mentioned normal and isomeric butyl, amyl, dibutyl, and diamyl phenols and cresols, tripropyl phenols and cresols, heptyl, octyl, nonyl, decyl, undecyl, dodecyl, tetradecyl, cetyl, octadecyl and the like, phenols and cresols in addition to dihexyl- and trihexyl- phenol prepared from hexene-1 and phenol, diisoheptyl-phenol, dioctyl-phenol, dinonyl-phenol, dioctyl-p-cresol, dioctyl-o-cresol, didecyl-phenol, didecyl-p-cresol, didodecyl-phenol, and the like. Of particular value are the polyalkylene oxide derivatives of secondary and tertiary alkyl substituted phenols and cresols obtained by condensing olefins of the type obtained in petroleum refining with phenols and cresols. In the case of products obtained by condensing phenol or cresol with olefins of from 3 to 5 carbon atoms such as propylene, butylene or amylene, it is sometimes desirable to employ the dialkylated phenols or cresols, while in the case of compounds obtained by condensing a phenol or cresol with an olefin containing 8 or more carbon atoms, the mono-substituted derivatives are sometimes preferred. Particularly desirable derivatives can be obtained from the phenols and cresols containing a substituent derived from olefins containing from 8 to 18 carbon atoms, such as diisobutylene and other alkylenes as nonylene, decylene, undecylene, dodecylene, pentadecylene, octadecylene and mixtures thereof, and may advantageously be the dimers and trimers obtained by polymerization of such low molecular weight olefins as propylene, butylene, isobutylene, amylene or mixtures thereof.

However, the polyalkylene oxide derivatives of other organic compounds containing an active hydrogen may be employed as reactants in the present invention. Thus, the polyalkylene oxide derivatives, described in U.S. Patent 1,970,578, of aliphatic organic hydroxy compounds, may be employed if desired. As examples of water-insoluble higher fatty acids whose polyalkylene oxide derivatives may be employed may be mentioned lauric, oleic, ricinoleic, palmitic and stearic acid, and the like, or mixtures thereof, such as the mixtures obtained from animal and vegetable fats and oils or by the oxidation of such petroleum fractions as paraffin wax. As another preferred group, there may also be employed polyalkylene oxide derivatives of water-insoluble aliphatic hydroxy compounds such as higher aliphatic alcohols of at least 10 carbon atoms, i.e., the alcohols corresponding to the fatty acids specified immediately above, particularly the alcohols obtainable by hydrogenation of the fatty acids or glycerides present in animal or vegetable oils and waxes such as coconut oil, castor oil, and the like, as well as the polyalkylene oxide derivatives of organic mercapto compounds such as the products described in U.S. Patent 2,205,021, i.e., the polyalkylene oxide derivatives of such mercapto compounds as dodecyl mercaptan, oleyl mercaptan, cetyl mercaptan, decyl mercaptan and thio-phenols, thionaphthols, benzo-mercaptan, etc.; also the polyalkylene oxide derivatives of carboxylic acid amines such as those described in U.S. Patent 2,085,706, and of sulfonamides of the type described in U.S. Patent 2,002,613, or the polyalkylene oxide derivatives, described in U.S. Patent 2,226,141, or sulfonic acids may be employed if desired. Similarly, the surface active polyalkylene oxide derivatives disclosed in U.S. Patent 2,677,700 may also be employed in the instant invention.

Another group of non-ionic surface active agents which may be employed are those of the Pluronic type as disclosed for example, in U.S. Patent 2,674,619 and other patents. In general, in preparing these agents a suitable 1,2-alkylene oxide or substituted alkylene oxide, as for example butylene oxide, amylene oxide, phenyl ethylene oxide (oxystyrene), cyclohexene oxide, cyclooctene oxide, or preferably propylene oxide, or a mixture thereof, is polymerized in the presence of an alkaline catalyst such as sodium hydroxide, preferably at elevated temperatures and pressures to produce the corresponding water-insoluble polypropylene glycol or substituted polypropylene glycol having a molecular weight of about 300 to 3000. Said polyglycol is then reacted under similar conditions with the required number of moles of ethylene oxide to yield the desired non-ionic surface active agents employed herein. These agents should generally have a molecular weight ranging from about 1200 to 15,000 and preferably about 2000 to 10,000. Alternatively, ethylene diamine, propylene diamine, other alkylene diamines and polyalkylene polyamines, in addition glycol, propylene glycol, 1.4-butanediol, hexamethylene glycol and other diols may be reacted with the required number of moles of propylene oxide or substituted propylene oxide to produce the corresponding water-insoluble polypropylene glycols and substituted polypropylene glycols having a molecular weight of about 300 to 3000 as described above, followed by reaction with the required number of moles ethylene oxide. It will be understood that these Pluronic types of non-ionic surface active agents will ordinarily be of the diol type containing two terminal hydroxy (ethanol) groups. One of these terminal hydroxy groups may be blocked by reaction with an etherfying agent, esterifying agent, or the like prior to phosphation. However, if not so blocked or protected, it may in some instances be advisable to increase the proportion of this non-ionic surface active agent employed in the posphation reaction to up to double the proportions referred to above. Whether blocked or unblocked, these agents will generally produce a more complex mixture of reaction products due to a tendency towards chaining, cross-linking, and/or ring closing, and the like.

Another preferred group of non-ionic surface active agents are the condensation products of at least one mol of ethylene oxide with one mol of a multi-branched chain primary aliphatic alcohol having the molecular configuration of an alcohol produced by the Oxo process from a polyolefin of at least 7 carbon atoms. Such alcohols are prepared by the catalytic reaction of a polyolefin such as tripropylene, tetrapropylene, pentapropylene, diisobutylene, triisobutylene, tetraisobutylene, propylene-isobutylene and tributene and the like with carbon monoxide and hydrogen to form an aldehyde followed by catalytic reduction of this aldehyde to a primary alcohol. This two-stage process is well known as the Oxo process and alcohols produced by such process may be designated as Oxo alcohols. A particularly preferred alcohol of this type is the Oxo tridecyl alcohol produced from tetrapropylene or triisobutylene. These alcohols are reacted with the required number of mols of ethylene oxide to produce non-ionic surface active agents effective as reactants herein.

The following is an illustrative, non-limitative list of some specific examples of suitable non-ionic surface active agents which may be employed. In this list, E.O. means "ethylene oxide" and the number preceding same refers to the number of mols thereof reacted with one mol of the given reactive hydrogen-containing compound.

| | Plus Mols of E.O. |
|---|---|
| Nonyl | 9–11 |
| Nonylphenol | 2 |
| Dinonylphenol | 7 |
| Dodecylphenol | 18 |
| Castor oil | 20 |
| Tall oil | 18 |
| Oleyl alcohol | 20 |
| Lauryl alcohol | 4 |
| Lauryl alcohol | 15 |
| Hexadecyl alcohol | 12 |
| Hexadecyl alcohol | 20 |
| Octadecyl alcohol | 20 |
| Oxo tridecyl alcohol (from tetrapropylene) | 7, 10, 15 |
| Dodecyl mercaptan | 9 |
| Soya bean oil amine | 10 |
| Rosin amine | 32 |
| Coconut fatty acid amine | 7 |
| Cocoa fatty acid | 10 |
| Dodecylbenzene sulfonamide | 10 |
| Decyl sulfonamide | 6 |
| Oleic acid | 5 |
| Polypropylene glycol (30 oxypropylene units) | 10 |

The amount of non-ionic surface active agent present in the ink formulations of the invention can be over a wide range depending on the desired water-dispersibility and the surface active properties. Generally, from 5–10 parts of non-ionic surface active agent per 100 parts of ink formulation provide satisfactory results.

Water and rosin size are additional ingredients of the ink formulation and are present therein in amounts of from 25–60 parts of water and from 5–35 parts of rosin size per 100 parts of ink formulation. In general the amounts of water and rosin size can be varied to adjust the viscosity to within a desirable range, i.e., of from 800 to 1500 cps. at 25° C. depending on the particular design flowability desired. The rosin size is available usually as a thick aqueous paste having a solids content of from 70–80% of rosin (30–40% free unsaponified rosin) to completely saponify with caustic soda.

The sulfonated castor oil is present in the ink formulations in amounts varying from 10–20 parts per 100 parts of the ink formulation.

The following examples will serve to illustrate the preparation of the metalliferous azo dyes and the preparation of ink formulations containing the same.

EXAMPLE 1

One one-hundredth of a mol of the chromium complex of the dyestuff from nitrated 1-diazo-2-hydroxynaphthalene-4-sulfonic acid and 2-hydroxynaphthalene, containing 1 atom of chromium in complex union with 1 molecule of dyestuff, is heated at 90° C. with 0.01 mol of the dyestuff from diazotized 5-nitro-2-amino-1-hydroxybenzene and 2-hydroxynaphthalene in 200 cc. of water with the addition of 10 cc. of a 2 N-solution of sodium carbonate, and the whole is maintained at 90–100° C. for one hour. The reaction mixture is then evaporated to dryness.

EXAMPLE 2

One one-hundredth of a mol of the chromium complex of the dyestuff from nitrated 1-diazo-2-hydroxynaphthalene-4-sulfonic acid and 2-hydroxynapthalene, containing one atom of chromium in complex union with one molecule of dyestuff, is heated at 95–100° C. with 0.009 mol of the dyestuff from diazotized 5-nitro-2-amino-1-hydroxybenzene and 2-hydroxynaphthalene in 200 cc. of water with the addition of 10 cc. of a 2 N-solution of sodium carbonate, and the whole is maintained at that temperature for 30 minutes. After the addition of a solution of 0.002 mol of the dyestuff from diazotized 2-amino-1-hydroxybenzene-5-sulfonic acid amide and 5:8-dichloro-1-hydroxynaphthalene in 100 cc. of hot water, the reaction mixture is heated to 100° C. and maintained at that temperature for 30 minutes. 5 grams of a solution of sodium chromosalicylate having a chromium content of 2.6 percent are then added. The reaction mixture is boiled for one hour under reflux and then evaporated to dryness in vacuo.

EXAMPLE 3

One one-hundredth of a mol of the dyestuff from diazotized 1-amino-2-hydroxynaphthalene-4-sulfonic acid and 2-hydroxynaphthalene is boiled with 0.01 mol of the dyestuff from diazotized 4-chloro-2-amino-1-hydroxybenzene-5-sulfonic acid methylamide and 2-hydroxynaphthalene in 400 cc. of water with the addition of 2 cc. of a 10 N-solution of sodium hydroxide and 30 grams of a solution of sodium chromosalicylate having a chromium content of 2.6 percent for one hour under reflux. If required, small amounts of impurities are filtered off. The chromium complex formed is precipitated from the solution by the addition of 60 grams of sodium chloride, filtered off and dried.

EXAMPLE 4

5 parts of black dye of Example 1 are dissolved in 35 parts of preheated water and heated until dissolved. 28 parts of sulfonated castor oil (48%), 25 parts of rosin size (70%), and 7 parts of polyethoxylated castor oil containing 40 moles of ethylene oxide are stirred until the composition is homogeneous.

Mimeograph prints obtained from this dry ink dry fairly quickly, do not smear, are free of oil migration and "halo" effects. Rewettability of the pad after standing a few days is also excellent.

EXAMPLE 5

5 parts of the dye of Example 2 are dissolved in 35 parts of preheated water, to which is then added 28 parts of sulfonated castor oil (48%), 25 parts of rosin size (70%) and 7 parts of polyethoxylated castor oil containing 40 moles of ethylene oxide. The composition is stirred until homogeneous.

Mimeograph prints obtained from this ink dry quickly, do not smear, and in general have excellent properties.

EXAMPLE 6

5 parts of the dye of Example 3 are dissolved in 35 parts of preheated water with warming, to which is then added 28 parts of sulfonated castor oil (48%), 25 parts of rosin size (70%) and 7 parts of polyethoxylated castor oil containing 40 moles of ethylene oxide. The composition is stirred until homogeneous.

Dark blue mimeograph prints are obtained which have excellent properties.

While the invention has been described in particularity in the preceding examples in certain of its embodiments it is obvious that many equivalents can be employed without departing from the spirit and scope of the invention; therefore, it is intended that the appended claims be interpreted in their broadest sense insofar as the state of the art permits.

What is claimed is:

1. A duplicating ink formulation comprising a water solution of 3 to 10 parts of a metalliferous monoazo-dyestuff, which contains one atom of a metal bound in complex union to two molecules of different monoazo dyestuffs both of which are free from carboxylic acid groups in a position other than an ortho-position relative to the azo linkage and which together contain a single sulfonic acid group, 5 to 10 parts of a nonionic surface active agent, 5 to 35 parts of rosin size, 10 to 20 parts of a sulfonated castor oil and the balance water, said proportions being based on 100 parts by weight of said formulation.

2. The ink formulation according to claim 1 wherein the metal bound in complex union to two molecules of different monoazo dyestuffs is chromium.

3. The ink formulation according to claim 1 wherein the metal bound in complex union to two molecules of different monoazo dyestuffs is cobalt.

4. The ink formulation according to claim 1 wherein the nonionic surface active agent is an alkylene oxide adduct of an active hydrogen containing compound.

5. The ink formulation according to claim 1 wherein the nonionic surface active agent has a molecular configuration of a condensation product of at least one mole of ethylene oxide with a compound containing about 6 to 150 carbon atoms and a reactive hydrogen atom and selected from the group consisting of phenol, alkyl phenols, aliphatic alcohols, fatty acids, fatty amines, fatty amides, rosin amines, long chain sulfonamides, long chain-substituted aryl sulfonamides and high molecular weight mercaptans.

6. The ink formulation according to claim 5 wherein the nonionic surface active agent is a condensation product of at least one mole of ethylene oxide and nonyl phenol.

7. The ink formulation according to claim 5 wherein the nonionic surface active agent is a condensation product of at least one mole of ethylene oxide and oleic acid.

8. The ink formulation according to claim 5 wherein the nonionic surface active agent is a condensation product of at least one mole of ethylene oxide and lauryl alcohol.

9. The ink formulation according to claim 5 wherein the nonionic surface active agent is a condensation product of at least one mole of ethylene oxide and dodecyl mercaptan.

10. The ink formulation according to claim 5 wherein the nonionic surface active agent is a condensation product of at least one mole of ethylene oxide and rosin amine.

11. The ink formulation of claim 1 wherein the metalliferous monoazo dyestuff contains one molecule of the monoazo-dyestuff from nitrated 1-diazo-2-hydroxynaphthalene-4-sulfonic acid and 2-hydroxynaphthalene and one molecule of the monoazo dyestuff from diazotized 5-nitro-2-amino-1-hydroxybenzene and 2-hydroxynaphthalene bound in complex union to one atom of chromium.

12. The ink formulation of claim 1 wherein the metalliferous monoazo-dyestuff contains 1 molecule of the monoazo-dyestuff from diazotized 1-amino-2-hydroxynaphthalene-4-sulfonic acid and 2-hydroxynaphthalene and 1 molecule of the monoazo-dyestuff from diazotized 4-chloro-2-amino-1-hydroxybenzene-5-sulfonic acid methylamide and 2-hydroxynaphthalene in complex union with one atom of chromium.

13. The ink formulation of claim 1 wherein the metalliferous monoazo-dyestuff contains one molecule of the monoazo-dyestuff from nitrated 1-diazo-2-hydroxynaphthalene-4-sulfonic acid and 2-hydroxynaphthalene and 1 molecule of the monazo-dyestuff from diazotized 2-amino-1-hydroxybenzene-5-sulfonic acid amide and 5:8-dichloro-1-hydroxynaphthalene bound in complex union with one atom of chromium.

References Cited

UNITED STATES PATENTS

| | | | |
|---|---|---|---|
| 2,868,741 | 1/1959 | Chambers et al. | 106—24 X |
| 2,771,372 | 11/1956 | Chambers et al. | 106—22 |
| 2,884,332 | 4/1959 | Locher et al. | 106—22 |
| 2,966,419 | 12/1960 | Anderson | 106—23 |
| 3,036,059 | 5/1962 | Ehrhardt et al. | 106—22 X |
| 3,086,872 | 4/1963 | Locke | 106—22 |
| 3,246,997 | 4/1966 | Sumner et al. | 106—22 |

OTHER REFERENCES

Ellis, Printing Inks, N.Y. Reinhold Pub. Corp. 1940 (pp. 337–349).

JULIUS FROME, *Primary Examiner.*

J. B. EVANS, *Assistant Examiner.*